United States Patent
Schueller et al.

[11] Patent Number: 6,143,412
[45] Date of Patent: Nov. 7, 2000

[54] FABRICATION OF CARBON MICROSTRUCTURES

[75] Inventors: Olivier J. A. Schueller, Somerville; Scott Brittain, Cambridge; George M. Whitesides, Newton, all of Mass.

[73] Assignee: President and Fellows of Harvard College, Cambridge, Mass.

[21] Appl. No.: 08/797,165

[22] Filed: Feb. 10, 1997

[51] Int. Cl.[7] .................................................. B32B 9/00
[52] U.S. Cl. .................... 428/408; 428/213; 428/334; 428/335; 428/336; 428/338; 428/402.24
[58] Field of Search .................... 428/213, 334, 428/335, 336, 338, 402.24, 408; 606/151; 429/241; 442/1–58; 174/117 M; 209/391–403; 245/1–11; 313/295, 349–350; 87/12, 53; 96/296, 363; 166/230

[56] References Cited

U.S. PATENT DOCUMENTS

| | | |
|---|---|---|
| 3,932,568 | 1/1976 | Watts et al. . |
| 4,035,265 | 7/1977 | Saunders . |
| 4,137,477 | 1/1979 | Krol et al. . |
| 4,466,932 | 8/1984 | Koyama et al. . |
| 4,612,100 | 9/1986 | Edeling et al. .................... 204/192.15 |
| 4,706,430 | 11/1987 | Sugita et al. . |
| 4,791,037 | 12/1988 | Anderman . |
| 4,804,592 | 2/1989 | Vanderborgh et al. . |
| 4,936,956 | 6/1990 | Wrighton ............................. 204/153.21 |
| 5,074,313 | 12/1991 | Dahl et al. . |
| 5,103,837 | 4/1992 | Weidlich et al. . |
| 5,110,579 | 5/1992 | Anthony et al. . |
| 5,118,403 | 6/1992 | Magee, Jr. et al. ..................... 204/400 |
| 5,147,590 | 9/1992 | Preidel et al. . |
| 5,236,686 | 8/1993 | Tour et al. ............................... 423/445 |
| 5,458,632 | 10/1995 | Preidel et al. ........................... 607/121 |
| 5,503,728 | 4/1996 | Kaneko et al. ...................... 204/290 R |
| 5,512,131 | 4/1996 | Kumar et al. ......................... 156/655.1 |
| 5,578,901 | 11/1996 | Blanchet-Fincher et al. .......... 313/496 |
| 5,584,979 | 12/1996 | Lewenstam et al. ................... 204/418 |
| 5,698,485 | 12/1997 | Bruck et al. .............................. 501/87 |
| 5,776,748 | 7/1998 | Singhvi et al. .......................... 435/180 |

FOREIGN PATENT DOCUMENTS

| | | |
|---|---|---|
| 0 624 558 | 11/1994 | European Pat. Off. . |
| 0 629 593 B1 | 12/1994 | European Pat. Off. . |
| WO96/29629 | 6/1996 | WIPO . |

OTHER PUBLICATIONS

E. Kim et al., "Micromolding in Capillaries: Applications in Material Science", J. Am. Chem. Soc., vol. 118, No. 24, pp. 5722–5731, Jun. 1996.

E. Kim et al., "Polymer Microstructures Formed by Moulding in Capillaries", Natrure, vol. 376, No. 6541, pp. 581–584, Aug. 1985.

T. M. Bloomstien et al., "Stereo Laser Micromachining of Silicon", Appl. Phys. Lett., vol. 61, No. 1, pp. 708–710, Jul. 1992.

G. Leyendecker et al., "Laser Induced Chemical Vapor Deposition of Carbon", Appl. Phys. Lett., vol. 39, No. 11, pp. 921–923, Dec. 1981.

O.J.A. Schueller, et al., "Fabrication of Glass Carbon Microstructures by Pyrolysis of Microfabricated Polymeric Precursors", Advanced Materials, vol. 9, No. 6, pp. 477–480 (May, 1997).

G. Savage, "Thermosetting Resin Matrix Precursors," Carbon–Carbon Composites, 1st Edition, Chapter 4, pp. 117–156, 1993.

Primary Examiner—William Krynski
Assistant Examiner—B. Shewareged
Attorney, Agent, or Firm—Wolf, Greenfield & Sacks, P.C.

[57] ABSTRACT

A technique for forming high-carbon structural articles, such as glassy carbon articles, is provided that involves molding fluid precursors of the article into a predetermined shape, followed by carbonization of the articles. An elastomeric mold can be used to mold the precursors, and the resultant, free-standing articles have features on the micron or nanometer scale. A variety of useful articles including sensors, actuators, microelectromechanical systems, transmission electron microscopy grids, and the like are provided.

19 Claims, 9 Drawing Sheets

FABRICATION OF CARBON MICROSTRUCTURES

This invention was sponsored by NSF Grant No. DMR 9400396, ONR Grant Nos. N00014-94-0929 and N00014-95-1-1182 and the government has certain rights to this invention.

FIELD OF THE INVENTION

The present invention relates generally to high-carbon solid articles, and more particularly to a method for making these articles on the micro scale by molding them from fluid precursors.

BACKGROUND OF THE INVENTION

In the fields of chemistry, biology, materials science, microelectronics, optics, and medicine, the development of devices that are small relative to the state of the art and that are conveniently and relatively inexpensively reproduced is important.

A well-known method of production of devices, especially in the area of microelectronics, is photolithography. According to this technique, a negative or positive resist (photoresist) is coated onto an exposed surface of an article. The resist then is irradiated in a predetermined pattern, and portions of the resist that are irradiated (positive resist) or nonirradiated (negative resist) are removed from the surface to produce a predetermined pattern of resist on the surface. This is followed by one or more procedures. According to one, the resist serves as a mask in an etching process in which areas of the material not covered by the resist are chemically removed, followed by removal of resist to expose a predetermined pattern of a conducting, insulating, or semiconducting material. According to another, the patterned surface is exposed to a plating medium or to metal deposition (for example under vacuum) followed by removal of resist, resulting in a predetermined plated pattern on the surface of the material. In addition to photolithography, x-ray and electron-beam lithography have found analogous use. Lithography techniques such as those and are relatively labor intensive. The techniques require the design and fabrication of chrome masks, access to clean rooms, and the like.

Microelectromechanical systems are an area of relatively intensive research. These systems involve the fabrication of micro-scale structures prepared from silicon, or occasionally from other material such as gallium arsenide, metals, glasses, ceramics, or plastics, by typical integrated circuit industry microfabrication techniques such as photolithography or additive/subtractive processes such as deposition and etching. While interesting systems have been developed, simplification and increased versatility would be advantageous.

Carbon structures such as glassy carbon have numerous laboratory, metallurgical, mechanical, and electrical applications. Glassy carbon has found extensive use in connection with products such as beakers, joints, frits, brushes, contacts, furnace jigs and fixtures, bearings, slip rings, nozzles, valves, and the like. Glassy carbon has found use in biomedical applications, such as in the production of heart valves. U.S. Pat. No. 5,458,632 (Preidel) describes glassy carbon structures that are implantable in a clinical environment. Preidel describes low-surface-area glassy carbon electrodes (surface: 0.125 $cm^2$) which, when incubated with aqueous solutions of tissue-plasminogen activator, are resistant to blood clotting. U.S. Pat. No. 4,612,100 (Edeling) describe implantable electrodes produced by sputtering of glassy carbon on a part of a surface of an electrode to be implanted. Stimulating electrodes, that is, heart pacers, are mentioned.

U.S. Pat. No. 5,118,403 (Magee) describe a linear array electrode for use in a flowcell detector. A dicing saw is used to create an array of parallel grooves in a surface of a glassy carbon layer to form an array element. The resultant, grooved article is embedded in an electrically-insulating material such that the surface of each ridge (between each groove) is exposed. The exposed, linear, parallel ridges, each having a width in the range of 10–100 microns, defines the array.

These and other techniques for the use of glassy carbon, including the production of small-scale devices, are useful in some circumstances. However, these techniques typically involve more than a desirable number of fabrication steps, and in many cases it would be advantageous to reduce the cost, and increase versatility, associated with these techniques. Additionally, micromachining or other destructive techniques for creating a desired shape in glassy carbon is difficult to perform accurately due to the brittle nature of glassy carbon, which derives its name from its fracture behavior, i.e., a behavior similar to that of glass.

Carbon fibers are known for many small-scale applications. Carbon fibers are very strong, but the tailorability of mechanical and electrical properties of carbon fibers is limited. Additionally, carbon fibers cannot readily be formed into a variety of shapes.

Accordingly, it is an object of the invention to provide a technique for forming high-carbon solid structures on the micro- and nanoscale conveniently, inexpensively, and reproducibly.

SUMMARY OF THE INVENTION

The present invention provides techniques for forming high-carbon solvent structures, and high-carbon solid structures formed according to the described and other methods. In one aspect, the invention provides a method that involves forming a precursor of a high-carbon solid structure against a surface of a mold. The method then involves removing the mold from the precursor. The forming step comprises, according to one embodiment, forming the precursor between the surface of the mold and a substrate. The mold then is removed from the precursor and the precursor remains on the substrate. In a further embodiment, the precursor is removed from the substrate and a free-standing high-carbon solid structure is formed. The free-standing structure is rigid enough to maintain its shape without support along all surfaces of the structure. For example, a small portion of the structure can be held with a support such as a clamp, the remainder of the structure remaining essentially rigid.

In another embodiment, the invention provides a method that includes forming a precursor of a high-carbon solid structure into a shape of a mold, and hardening the fluid precursor. A high-carbon solid article, in the shape of the mold, is thereby formed. This method can be carried out using the technique described above, namely, forming the structure against a surface of the mold, and can involve other described steps.

In another embodiment, a method of the invention involves forming, simultaneously, at least two high-carbon solid structures from fluid precursors of the structures. This can involve forming the fluid precursors against at least two indentations in a surface of a mold, and allowing the fluid precursors to harden against the at least two indentations. The precursors then can be carbonized to form the at least two high-carbon solid structures.

In the above methods, one or more precursors can be placed against one or more surfaces of a mold (or one or more indentations in a surface that define two or more molds), heating the precursor, removing the mold, and carbonizing the precursor to form a high-carbon solid structure. The heating step is generally carried out to partially or fully cross-link a polymeric precursor, or polymerize a precursor that can include monomeric species. The method can involve carbonizing the precursor to form a high-carbon solid structure having a dimension of less than 2 mm.

In another embodiment, a method of the invention involves applying a fluid precursor of a high-carbon solid structure to an indentation pattern in the surface of an elastomeric mold, applying the elastomeric mold to a surface of a substrate to encapsulate the fluid precursor between the substrate surface and the indentation pattern, and heating the precursor. Then, the mold is removed from the substrate and from the precursor. The precursor then is carbonized to form a high-carbon solid structure having a dimension of less than 2 mm, and the high-carbon solid structure is removed from the mold to form a free-standing high-carbon solid structure.

In another aspect, the invention provides a method of etching a high-carbon solid material. A portion of a film of a high-carbon solid material can be etched, while leaving a second portion of the film free of etching.

Another method provided in accordance with the invention involves removing a sample from an environment highly corrosive to metal with a transmission electron micrograph (TEM) grid of a mesh of at least 100. The method can further involve exposing the sample to TEM conditions on the grid. In another embodiment, the method involves exposing a sample to TEM conditions while supporting the sample on a high-carbon solid support of a mesh of at least 100.

According to another aspect, articles are provided in accordance with the invention. In one embodiment, the invention provides a free-standing, high-carbon solid structure having a dimension of less than 2 mm. In another embodiment, the dimension is less than 1 mm, and in yet another embodiment less than 0.5 mm. In other embodiments the structure has a dimension of less than 0.25 mm, less than 100 nm, or less than 50 nm.

The invention provides, according to another embodiment, an article comprising a transmission electron micrograph grid of at least 100 mesh, made of a carbon solid. The TEM grid can have a mesh of at least 200, 300, 400, 500, or 600 mesh in other embodiments.

According to another aspect, a diffraction grating having a diffracting surface made of a high-carbon solid is provided in accordance with the invention.

The invention also provides an electron-beam focusing aperture made of a high-carbon solid structure.

In yet another aspect, the invention provides a method that involves forming a high-carbon structure that is a replica of a template structure. The method involves forming a precursor of the high-carbon structure against the surface of a mold cast from the template, and allowing the precursor to take the form of the mold.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure.

DETAILED DESCRIPTION OF THE INVENTION

U.S. patent application Ser. No. 08/616,929, entitled "Method of Forming Articles and Patterning Surfaces Via Capillary Micromolding", by Kim, et al., filed Mar. 15, 1996, is incorporated herein by reference.

The present invention provides techniques for forming high-carbon solid articles from precursors of these articles, using molds, and articles produced according to the techniques. A variety of articles useful in microanalytical, microelectrical, micromechanical, and medical and biomedical fields can be produced according to the techniques.

The high-carbon structures of the invention, for example glassy carbon structures, can be used in lieu of silicon in applications where light weight, high chemical resistance to strong bases, or thermal stability are required properties. The lower Young's modulus of glassy carbon (10–40 GPa) compared to that of silicon (190 GPa for monocrystalline silicon, 40–170 GPa for polysilicon) can be an advantage in applications where the brittleness of silicon is a limiting factor, or where the extreme stiffness of silicon is a disadvantage (for example, in electrostatically driven actuators). Furthermore, silicon surfaces have a high surface energy since they are covered with a 10–20 A thick native oxide layer. Surfaces with high free energies will be subjected to capillary forces when in close proximity. Stiction, that is, the adhesion between two surfaces, depends on van der Waals, electrostatic, and capillary forces. The contribution of capillarity accounts for most of the forces responsible for stiction. Stiction often limits the performance of microelectromechanical systems: once two surfaces are in contact, only a restoring force can separate them. The density of oxygen-containing, polar surface functional groups is lower on carbon than on Si/SiO2. The ability to functionalize the surface of oxidized carbon further to introduce hydrocarbon or fluorocarbon groups offers a route to materials with very low surface free energies and low potential for stiction. The relatively rough surface of carbon solids (relative to silicon etched along a crystal face) may also prevent stiction since the true area of contact between rough surfaces is smaller than between smoother surfaces.

The invention utilizes an applicator having an indentation pattern that can be used to transfer a fluid precursor of a high-carbon structure from the indentations to a substrate surface or that can serve as a mold that when, positioned proximate a substrate surface, can define a region in which the fluid precursor is positioned. The substrate can be another applicator.

Figure 1:
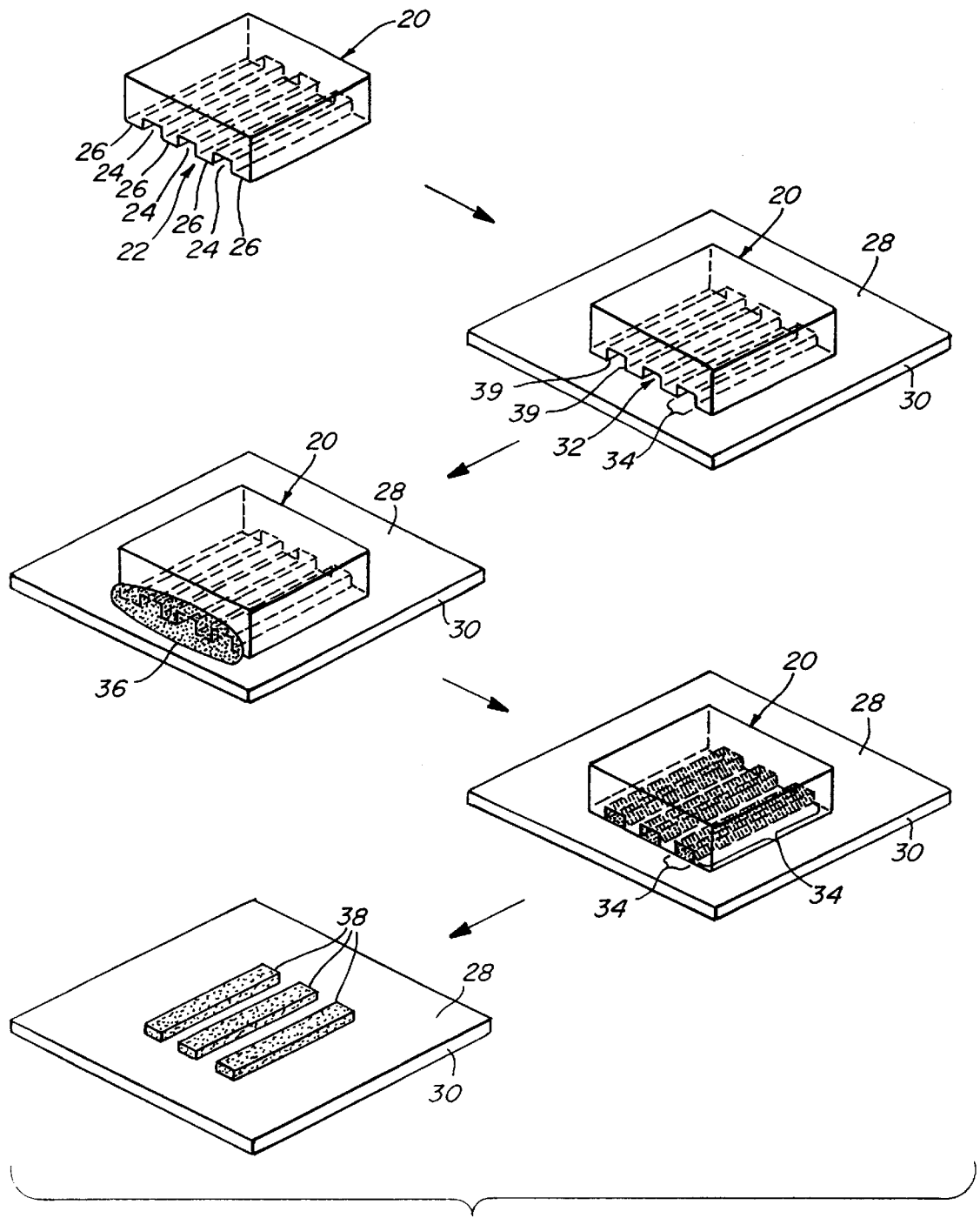
FIG. 1 illustrates schematically a technique for forming a high-carbon solid structure against a surface using a mold, from a fluid precursor.

FIG. 1 illustrates schematically a technique for forming a high-carbon structure at a substrate surface. An article 20, which serves generally as a mold, includes an application surface 22 including a plurality of indentations 24 that together define a linear, patterned array of indentations contiguous with a contact surface 26. Article 20, according to one embodiment, is an applicator used to transfer a precursor of a high-carbon structure, in a linear pattern, to a region or regions proximate the substrate surface. Article 20 also can define a forming article or micromold placed proximate the substrate surface and used to guide a fluid precursor of a high-carbon structure so as to position the precursor in a pattern at a predetermined region or regions proximate the substrate surface. As used herein, the term "proximate" is meant to define at a substrate surface, that is, in contact with a substrate surface, or at a position near a substrate surface and fixed relative to the substrate surface. For example, if a substrate surface carries an adhesion promoter, for example a self-assembled monolayer, activity at the surface of the self-assembled monolayer or adhesion promoter is intended to mean activity proximate the substrate surface.

When forming article 20 is placed proximate a surface 28 of a substrate 30, contact surface 26 of the article seals portions of surface 28 that it contacts, thereby forming channels 32 defined by indentations 24 and portions 34 of substrate surface 28 not contacted by contact surface 26. In this manner a micromold is created, which is defined by article 20 and substrate surface 28. A fluid precursor 36 of a high-carbon structure is placed adjacent one or more openings of channels 32 and introduced into the channels and allowed to flow adjacent portions 34 of substrate surface 28 in register with indentations 24. Fluid precursor 36 can be urged to flow via, for example, pressure applied to the fluid as it is positioned so as to enter the channels, or vacuum created within the channels by, for example, connection of the outlets of the channels to a source of vacuum. Alternatively, according to one aspect of the invention, the fluid can be allowed to flow into the mold via capillary action. Capillary filling of the mold is especially useful when the mold is of very small dimension (in particular in the micro scale) and is defined herein to mean that when a fluid precursor is positioned adjacent an opening or channel 32 formed by a portion 34 of the substrate surface and an indentation 24 of article 20, the fluid precursor will flow into at least a portion of the channel spontaneously.

Subsequent to introduction of high-carbon structure fluid precursor 36 into the mold defined by channel 32, the precursor can be solidified, or carbonized, before or after removal of applicator 20 from substrate surface 28. Where the fluid is viscous enough, for example via having been crosslinked by gentle heating, the applicator can be removed and the precursor hardened at the surface without unacceptable loss of dimensional integrity.

The pattern of parallel indentations 24 formed in surface 22 of micromold 20 is for illustrative purposes only. Any pattern, for example a pattern defined by a single indentation or many indentations, one or more of the indentations defining a non-linear pathway of uniform or non-uniform depth, is intended to fall within the scope of the invention. Various patterns are illustrated in subsequent figures. The indentation pattern can be of a variety of dimensions and, according to one aspect of the invention, includes a region having a dimension of less than 2 millimeters. The dimension can be a lateral dimension or vertical dimension. "Lateral dimension" is meant to define a dimension parallel to application surface 22. "Vertical dimension" is meant to define a dimension perpendicular to the surface. A lateral or vertical dimension can be a dimension of a feature that is a portion of an overall structure. That is, an overall structure could have a width of 5 millimeters parallel to the surface and a height of 5 millimeters relative to the surface, but include a ridge on the top of the structure of 0.5 millimeter height and 0.5 millimeter width. That sub-feature would, by definition, have a lateral dimension of 0.5 millimeter and a vertical dimension of 0.5 millimeter. According to preferred embodiments, the indentation pattern includes a portion having a dimension of less than about 1 mm, preferably less than about 500 microns or less than about 100 microns, more preferably less than about 50, 20, or 10 microns, and more preferably still less than about 5 microns. According to a particularly preferred embodiment, an indentation pattern having a portion including a dimension on the order of 1 micron is provided. The dimension of the indentations can be altered by deforming article 20, as described in co-pending, commonly-owned U.S. patent application Ser. No. 08/397,635, filed Mar. 1, 1995 by Whitesides, et al., entitled "Microcontact Printing on Surfaces and Derivative Articles", incorporated herein by reference.

Where micromold 20 is placed adjacent a substrate surface and a fluid precursor fills channels 32, high-carbon article or articles 38 resulting from the technique can have lateral dimensional features that correspond to the lateral dimensional features of indentations 32 of the micromold. According to another embodiment, the fluid precursor need not completely fill channels 32, and this is preferred according to embodiments in which the lateral dimension of high-carbon article 38 formed from the fluid precursor is to be minimized. According to this embodiment, fluid precursor 36 is introduced into channels 32 in an amount small enough that the fluid precursor wets only the corners of the channels. When a fluid precursor, substrate, and micromold are selected such that the fluid precursor will wet the micromold efficiently via capillary action, when a small amount of fluid precursor is supplied to the mold channel or channels, the precursor will selectively wet portions of the channels having an interior angle relatively low relative to the rest of the channel (such as corners 39 defined by the abutment of contact surface 26 against substrate surface 28 at the edge of region 34 of the substrate surface). When the fluid precursor wets the corners selectively and the precursor is carbonized to form a high-carbon structure, the resulting structure can define a pattern having a dimension smaller than that of the lateral dimension of indentation 24. According to this embodiment the lateral dimension of structure 38, at its narrowest, is narrower than the narrowest lateral dimension of channel 24 of the micromold, and can have a height significantly less than the height of the channel. The lateral dimension of high-carbon article 38 according to this embodiment can be on the order of less than or equal to about 100 microns or 50 microns, or preferably less than about 20 or 10 microns, more preferably less than about 5 microns or 1 micron, and according to a particularly preferred embodiment less than approximately 0.2 micron.

Any suitable material can define substrate 30 of the invention. Substrate surface 28 can be of the same material as the bulk material of substrate 30, or a different material. Substrates exposing a variety of functional surfaces such as hydrophobic, hydrophilic, and biologically compatible or non-compatible surfaces are known, and are suitable for use with the invention. Substrates that are somewhat fluid are known as well, and are acceptable for use in the invention to the extent that a useful pattern can be formed thereupon. In preferred embodiments, free-standing high-carbon structures are formed, and in these embodiments, it has been found that a substrate having a chromium surface against which a high-carbon structure is formed is most useful. In particular, a silicon wafer carrying a chromium film is particularly useful. Article 20 similarly can be formed of a variety of materials. According to a preferred embodiment, substrate surface 28 and/or contact surface 26 of article 20 is an elastomer or other conformable material. Preferably, contact surface 26 and more preferably, for ease of fabrication, the entire article 20, is formed of an elastomer, most preferably polydimethyl siloxane. When an elastomer defines substrate surface 28 or contact surface 26, or preferably micromold 20, an optimal seal is created between contact surface 26 and portions of substrate surface 28 adjacent and contiguous with portions 34 that with indentations 24 define channels 32. This results in optimal confinement of fluid precursor 36 to channels 32. According to the invention pressure can be applied to micromold 20 against substrate 30 during micromolding, but according to embodiments in which an elastomer is used as described, pressure need not be applied as the elastomer conforms well to the surface against which it mates thus sealing channels 32. The micromold 20 can be fabricated of an elastomer in a manner analogous to the fabrication of a stamp from an elastomer as described in co-pending, commonly-owned U.S. application Ser. No. 08/131,841 by Kumar, et al, entitled "*Formation of Microstamped Patterns on Surfaces and Derivative Articles*", filed Oct. 4, 1993, and incorporated herein by reference.

Figure 2:
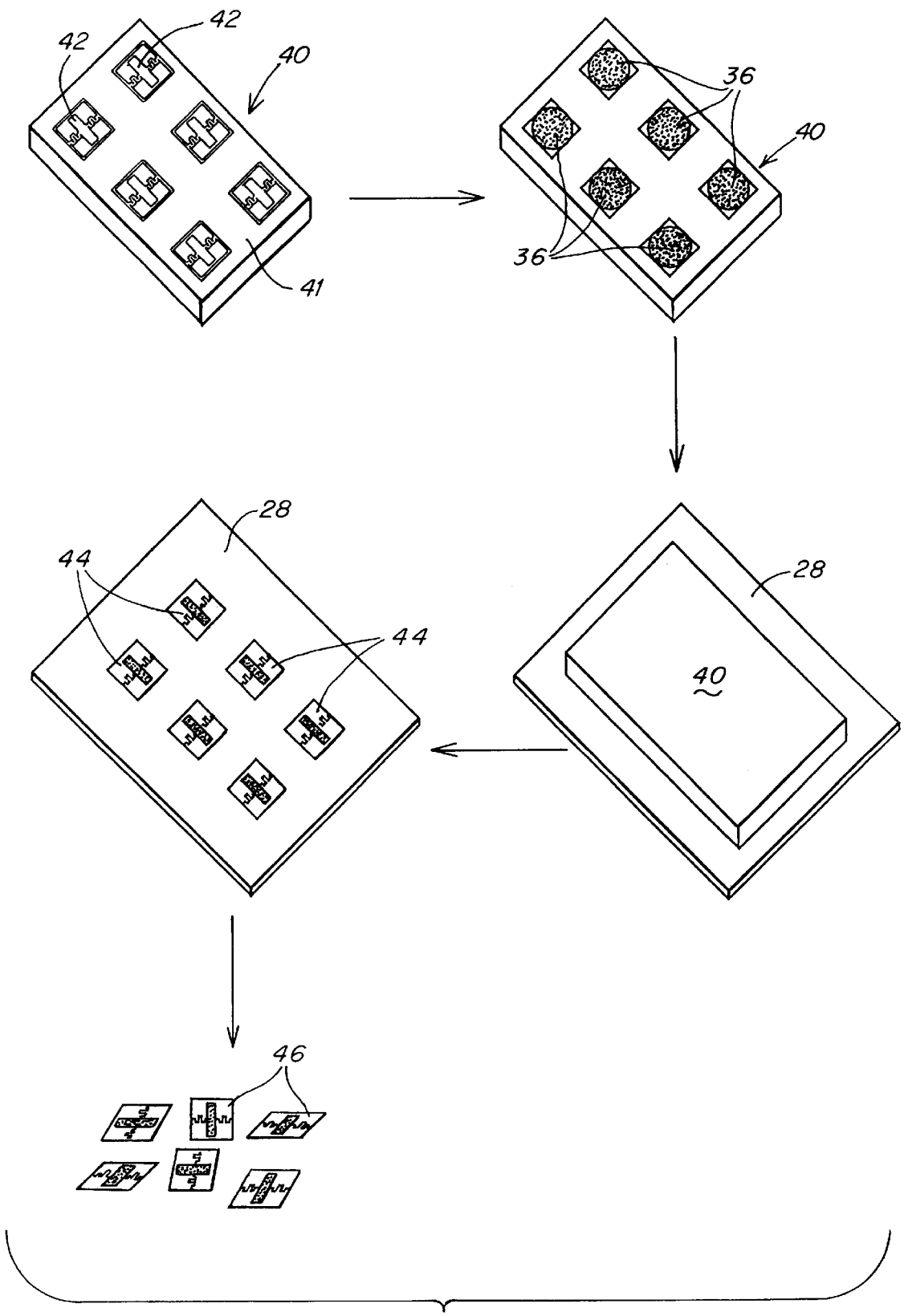
FIG. 2 is a schematic illustration of a technique for transferring a fluid precursor of a high-carbon solid structure from indentations in a mold to a substrate surface, forming high-carbon solid structures at the surface, and removing free-standing articles from the surface.

FIG. 2 illustrates another embodiment of the invention in which, rather than forming high-carbon structures via micromolding, a microtransfer molding technique is used to transfer a set of patterns, in parallel, to a substrate surface (parallel molding of a variety of similar patterns via micromolding as illustrated in FIG. 1 is embraced by the invention as well). In FIG. 2 a transfer article 40, which can be made of the same material from which article 20 is made, includes a plurality of indentation patterns 42 that can be identical. Application of the fluid precursor 36 to the plurality of indentation patterns 42, followed by positioning the indentation patterns of the applicator adjacent the substrate surface, results in transfer of the fluid precursor, in the pattern, to the substrate surface. Carbonization can take place prior to or after removal of the article from the substrate surface, preferably after removal of the article following brief, mild heating. As used herein, "carbonization" means treatment of a fluid precursor of a high-carbon structure to conditions, such as high temperature, that drives off any solvent and eliminates heteroatoms such as hydrogen, oxygen, and the like to a degree resulting in the percent carbon values listed herein. Greater degrees of carbonization can result in a greater carbon-to-hydrogen ration since higher conjugation is created. At higher conjugation, electrical conductivity increases.

Specifically, precursor 36 is applied to indentation patterns 42 preferably by coating the entire surface 41 with precursor 36, spreading the precursor back and forth across surface 41 with an applicator to assure filling of each of indentations 42, and removal of excess precursor until a small drop of precursor is left essentially in the center of the indentation pattern. Then, surface 41 of the applicator is brought into contact with substrate surface 28 to transfer the fluid precursor, in the pattern, to the substrate surface. At this point, the substrate and applicator are, together, heated gently to, for example, 150° C. by gradually raising the temperature for one hour, and then the applicator 40 removed, leaving a plurality of pre-carbonized high-carbon precursors 44, arranged in patterns corresponding to indentation patterns 42 of applicator 40, on substrate surface 28. Following carbonization under an inert atmosphere, high-carbon microstructures 46 can be allowed to remain on the substrate surface, or can be removed from the substrate surface to define free-standing articles.

According to the embodiment illustrated in FIG. 2, the fluid precursor 36 of high-carbon articles 46 is transferred essentially instantaneously to substrate surface 28, in indentation pattern 42.

As used herein, "high-carbon solid structure" is meant to define a structure having a final, structural carbon content of at least 40% carbon atoms based on the overall number of atoms present, preferably at least 50% carbon atoms, more preferably at least 75% carbon atoms, more preferably at least 80% carbon atoms, more preferably at least 90% carbon atoms, more preferably at least 95%, and more preferably still at least 98% carbon atoms that is obtained by carbonization (heating) of a fluid precursor that optionally can be carried in or dissolved in a fluid carrier or solvent. The definition is meant to embrace non-fibrous, organized carbon structures meeting these limitations, excluding pure diamond or graphite. In preferred embodiments, glassy carbon, also known as vitreous carbon, is used. Glassy carbon is described in *Carbon: Electrochemical and Physico-Chemical Properties*, K. Kinoshita, Wiley and Sons (1988). Glassy carbon is often produced by carbonization of organic polymeric precursors such as resins of furfuryl alcohol, phenol formaldehyde, acetone-furfural, or furfuryl alcohol-phenol copolymers. Both electrically conducting and electrically non-conducting, solid and open structures can be prepared from commercially available precursor. The high-carbon solid structures typically are prepared by heat treatment at elevated temperatures (1000–3000° C.) of polymeric precursors. The high-carbon solid structures of the invention preferably are electrically conducting, impermeable to gases, and have a low coefficient of thermal expansion, having a density of about 1.3–1.5 grams per cubic centimeter, and a non-interconnected porous microstructure. The structures are highly chemically stable (inert in strong acids and strong bases), and stable in air at temperatures up to 500° C. The structures typically have a Young's modulus of about 10–40 GPa. An exemplary fluid precursor of the high-carbon solid structures is a polymeric fluid sold under the trademark Furcarb™ by QO Chemicals, West Lafayette, Ind.

A simple screening test for determining useful precursors of high-carbon materials of the invention involves providing a known precursor and testing its viscosity to determine whether it can fill a mold having dimensions on the order of dimensions desired in a final high-carbon structure. If the material is too viscous, it can be determined whether viscosity can be lowered by dilution with a suitable solvent, preferably a low-boiling solvent that can be driven off via gentle heating prior to carbonization.

Figure 3:
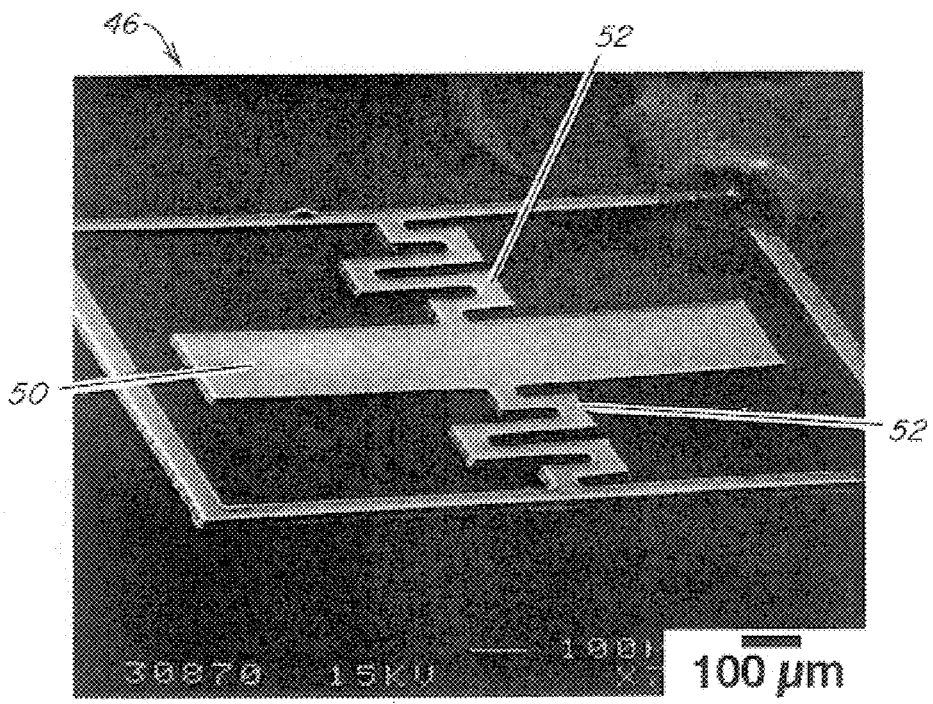
FIG. 3 is a photocopy of a scanning electron micrograph (SEM) image of a free-standing high-carbon structure.

FIG. 3 is a photocopy of an SEM image of a free-standing, high-carbon solid structure 46, fabricated in accordance with the technique of FIG. 2. By use of the term "free-standing", it is meant that the structure need not be supported by a substrate, and is not an integral part of a substrate. The structure has a variety of different feature sizes, and includes a central portion 50 supported only by two torsion members 52. Central portion 50 can be used to deflect light, to register acceleration or electrical field, and the like as described below in accordance with a variety of techniques.

Figure 4:
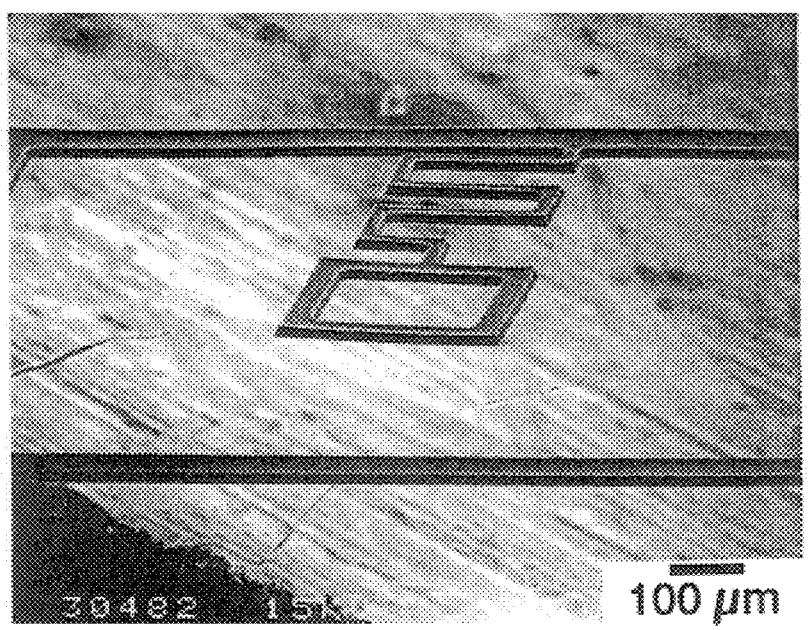
FIG. 4 is a photocopy of an SEM image of a free-standing, high-carbon structure.

FIG. 4 is an SEM image of another free-standing, high-carbon solid structure in a pattern including very small feature dimensions.

Figure 5:
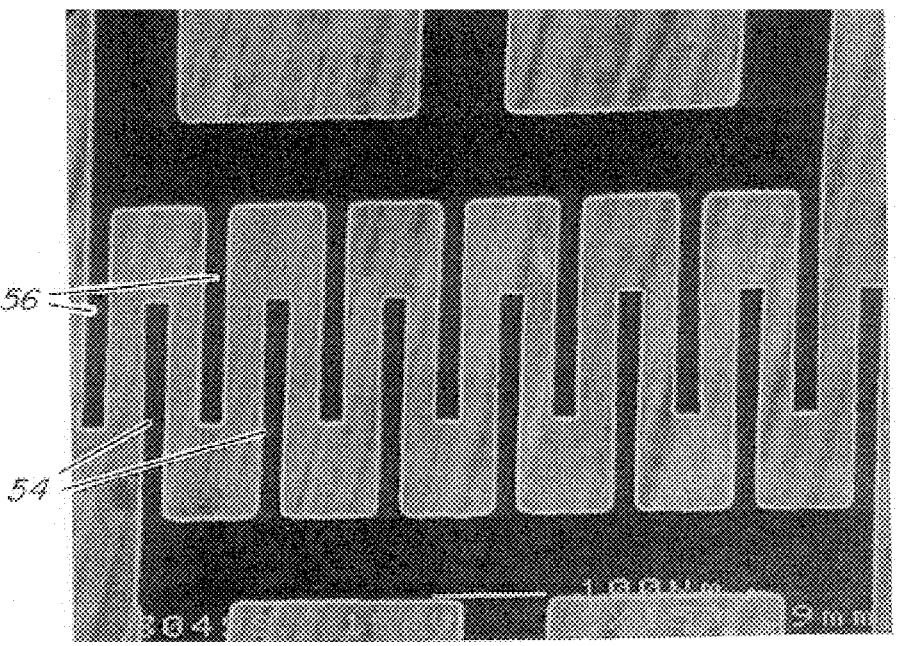
FIG. 5 is a photocopy of a scanning electron micrograph (SEM) image of a interdigitated electrode array formed of free-standing, high-carbon structures.

FIG. 5 is a photocopy of a SEM image of an interdigitated electrode array including a plurality of electrodes 54 interdigitated among electrodes 56. In an interdigitated array, the interdigitated electrodes may desirably not be electrically connected. Although not illustrated, an electrical and structural connection exists between electrodes 54 and electrodes 56 in FIG. 5, but this connection was subsequently broken to define a non-connected interdigitated array.

Figure 6:
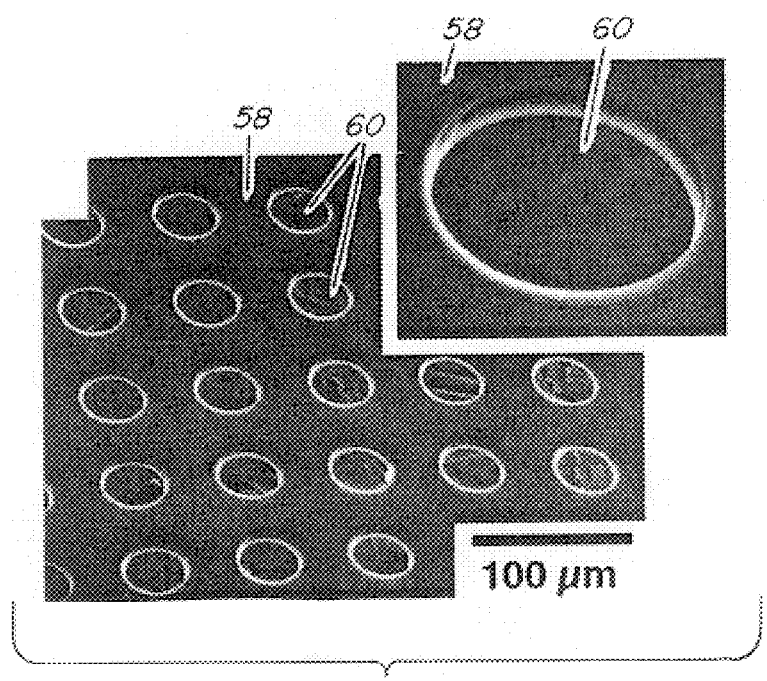
FIG. 6 is a photocopy of an SEM image of a high-carbon structure.

FIG. 6 is a photocopy of an SEM image (including inset) of a high-carbon solid structure 58 including a plurality of essentially circular holes 60. Article 58 is a free-standing structure formed by molding a fluid precursor of the structure between a chromium-coated silicon substrate and an elastomeric mold having a plurality of circular protrusions corresponding to holes 60. Article 58 is electrically conductive, and can be used as an electron-beam focusing apparatus or as one or more electrostatic lenses, in combination with a source of electrons. An arrangement could involve a first electrode on a first side of article 58 and a second electrode of opposite charge on a second side of article 58, an electrostatic charge being provided between the electrodes for passage of electrons through holes 60, where they are focused, and direction of the electrons to a target. One of ordinary skill in the art of electrostatics would recognize, on the basis of this disclosure, a range of suitable systems and applications.

Figure 7:
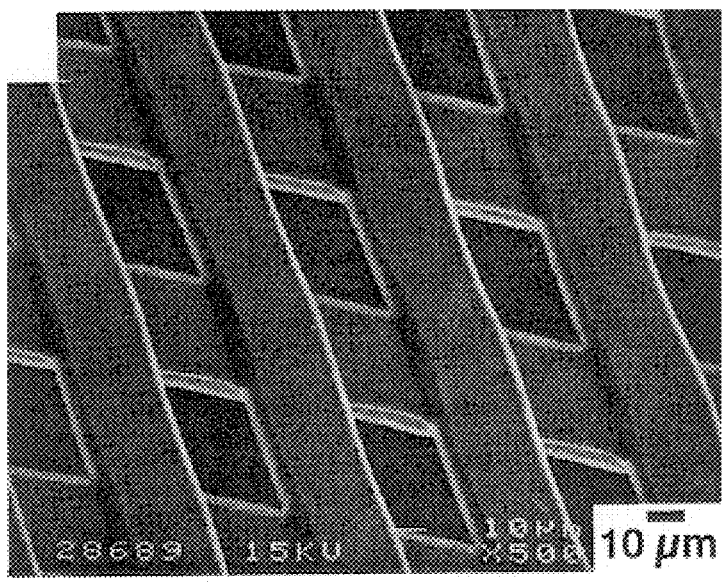
FIG. 7 is a photocopy of an SEM image of a high-carbon grid structure.

FIG. 7 is a SEM image of a high-carbon solid structure formed by placing together two elastomeric molds having contoured surfaces defining a linear array of grooves, the molds offset from each other in terms of alignment of linear grooves, followed by gentle heating to crosslink, and then carbonization.

Figure 8:
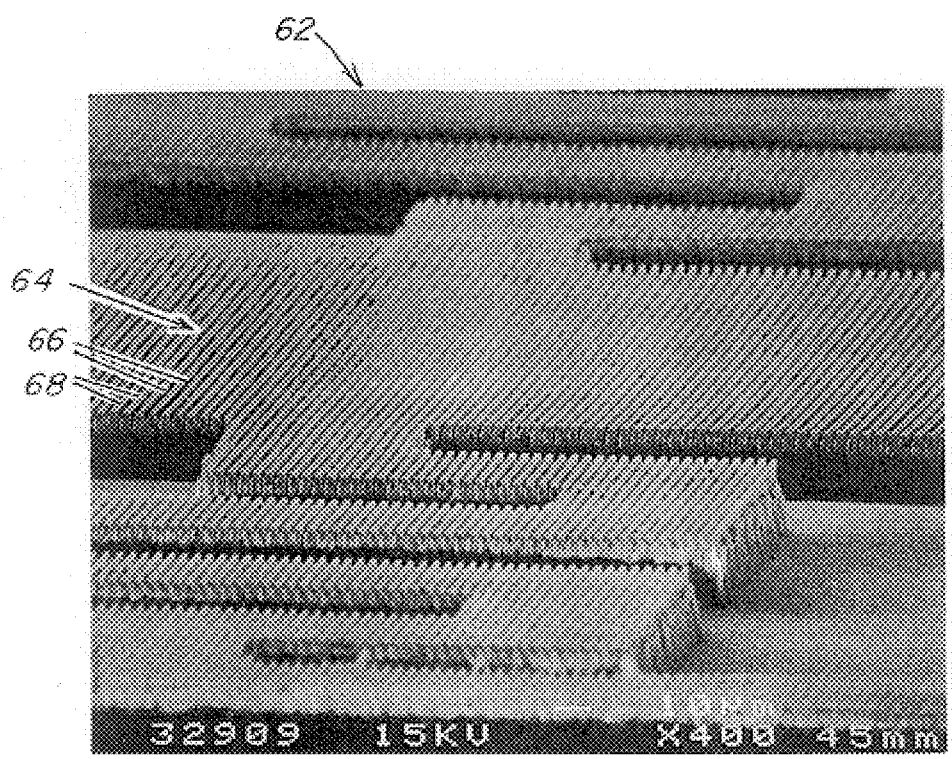
FIG. 8 is a photocopy of an SEM image of a crosslinked precursor of a high-carbon array, on a substrate, prior to carbonization.

FIG. 8 is an SEM image, before carbonization, of a high-carbon solid structure 62 similar to structure 46, but with smaller bulk feature dimensions. Additionally, article 62 includes a top surface 64 that is patterned with a series of aligned indentations 66 and protrusions 68.

Figure 9:
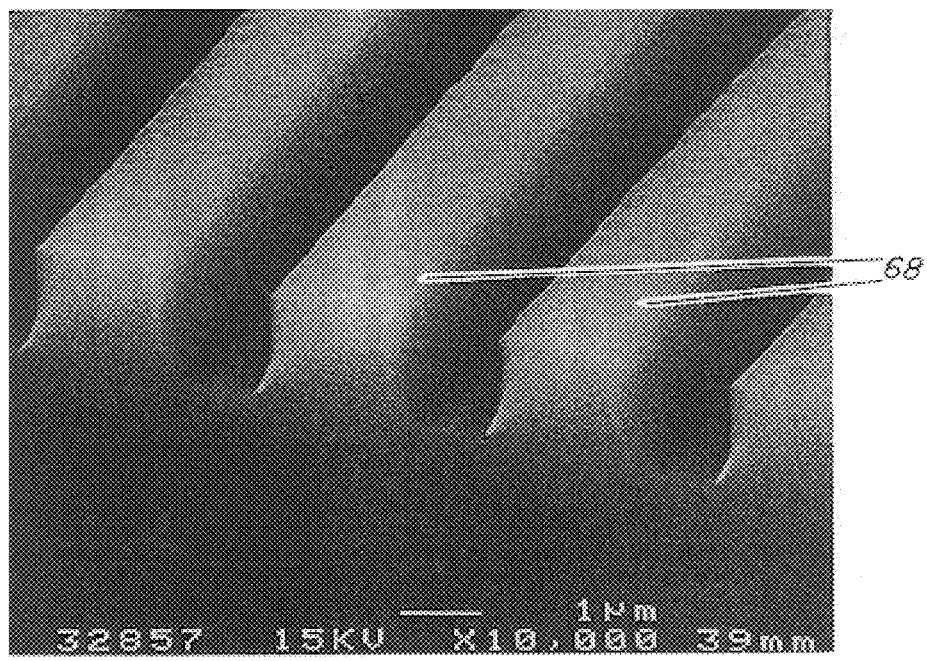
FIG. 9 is a photocopy of an SEM image of a fracture plane of the article of FIG. 8, following carbonization.

FIG. 9 is an SEM image of a fracture plane of the article of FIG. 8, following carbonization, showing the structure of protrusions 68. This "two-layer" structure can be formed readily in accordance with the technique of the invention in a single molding step, followed by carbonization, wherein the prior art at least a two-step process typically would be required, a first step involving preparation of the bulk of article 62 without protrusions 68, and a separate step, with a separate mask, necessary for formation of ridges 68. Article 62 can find use as a diffraction grating, and electrical or mechanical actuation of portions of article 62, as described below, facilitate use of the article as a sensor or other device. Protrusions 68 of article 62 are approximately 1 micron in height, and the remainder of article 62 is approximately 20 microns in height.

Figure 10:
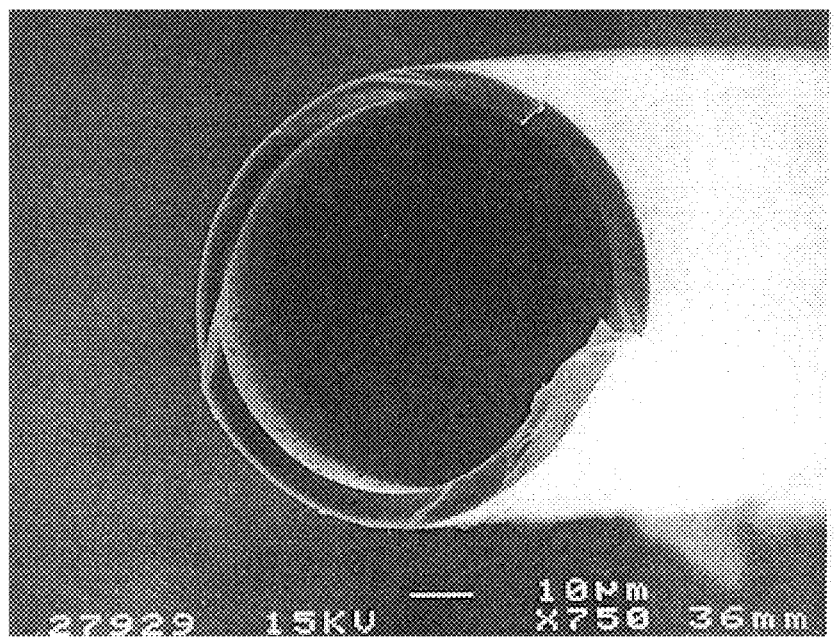
FIG. 10 is a photocopy of an SEM image of a high-carbon tube.

FIG. 10 is a photocopy of an SEM image of a high-carbon solid tube formed by carbonizing a commercially-available glass capillary coated with polyimide (sold for the purpose of capillary electrophoresis), and dissolution of the capillary with a suitable etchant.

Figure 11:
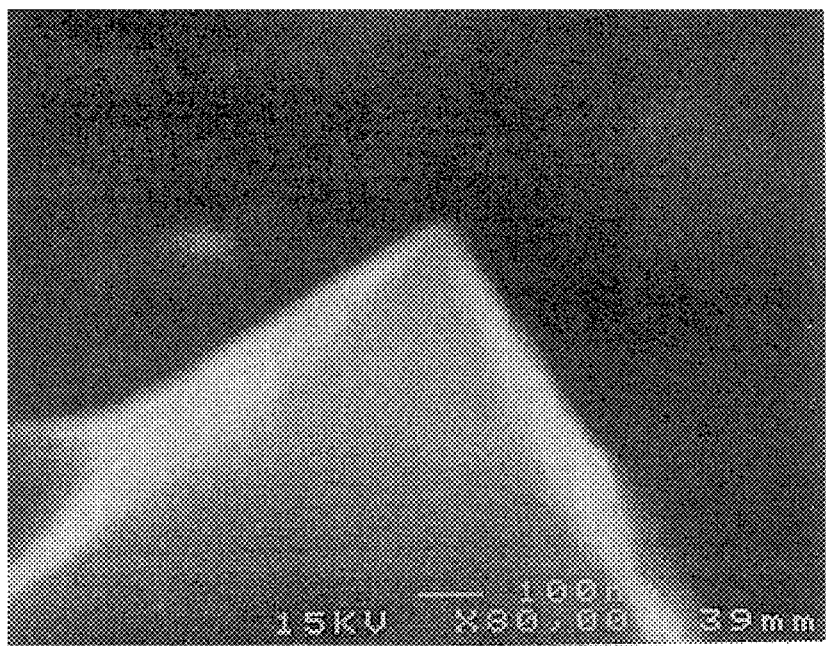
FIG. 11 is a photocopy of an SEM image of a high-carbon pyramidal structure.

FIG. 11 is a photocopy of an SEM image of an essentially pyramidal high-carbon solid structure. The pyramidal structure was formed using a technique involving casting an elastomeric mold against a surface of an anisotropically-etched silicon substrate.

Figure 12:
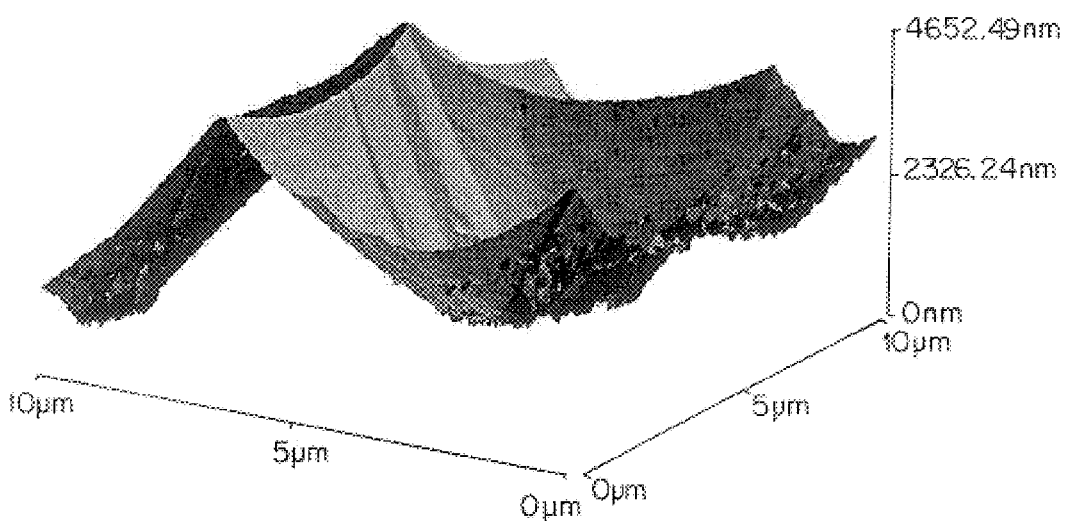
FIG. 12 is a photocopy of an atomic force microscopy (AFM) image of a pyramidal high-carbon structure.

FIG. 12 is an AFM image of a similarly-created essentially pyramidal high-carbon structural element. The feature size of the tip of the pyramidal structure of FIG. 12 is on the order of 100 nm.

Figure 13:
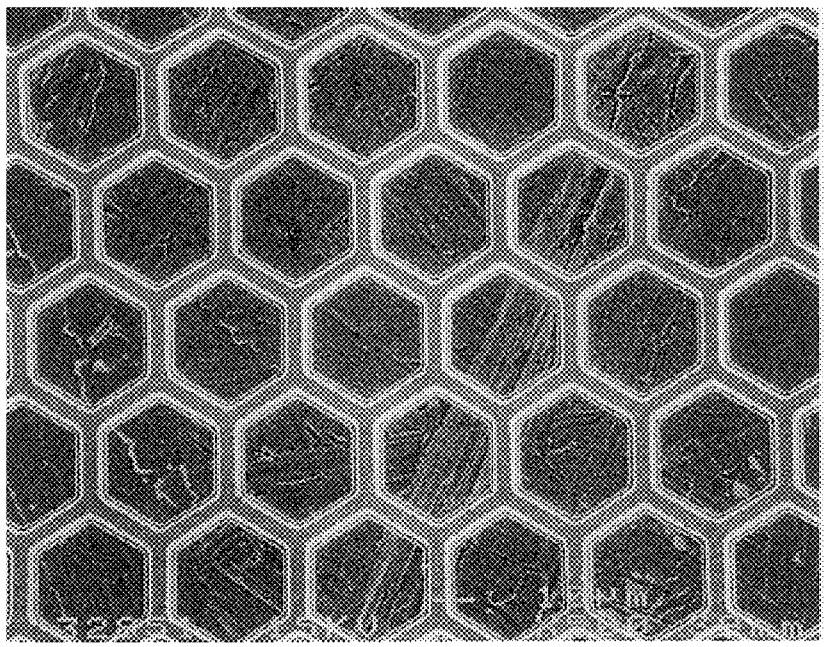
FIG. 13 is a photocopy of an SEM image of a prior art, copper, TEM grid.
Figure 14:
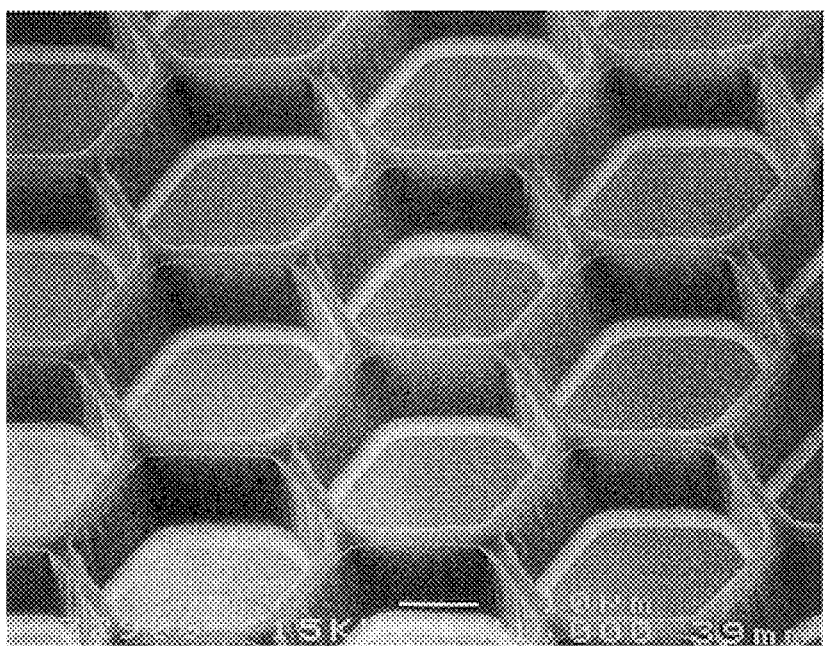
FIG. 14 is a photocopy of an SEM image of a high-carbon TEM grid.

FIGS. 13 and 14 are photocopies of SEM images of a comparative, copper TEM grid and a high-carbon solid TEM grid of the invention, respectively. In transmission electron microscopy (TEM), a sample is held by an electrically-conductive grid such as the commercially-available grid of FIG. 13, electrons are directed toward the sample, and an electron shadow image of the sample is recorded. It is important that the grid be electrically-conductive so as to dissipate charge resulting from electron bombardment of the grid. However, metal grids such as the prior art grid of FIG. 13 cannot withstand certain corrosive environments. The grid of the invention (FIG. 14) facilitates recovery of a sample from a very corrosive bath and exposure of the sample to TEM conditions.

The high-carbon solid TEM grids of the invention are a significant improvement over prior art grids not only because of the corrosion resistance described above, but because much smaller grids (higher mesh size) can be prepared in accordance with the invention than are known in the art for carbon grids. TEM carbon grids are known, but typically have a relatively course mesh of less than 100 (100 mesh is 100 grid bars per inch). Carbon TEM grids of the invention are provided of at least 100 mesh, preferably at least 250 mesh, more preferably at least 300 mesh, more preferably still at least 400 mesh, more preferably still at least 500 mesh, and in a particularly preferred embodiment, high-carbon TEM grids of at least or greater than 600 mesh, are provided.

Diamond TEM grids are manufactured by GMMT Ltd., UK, including 1 millimeter hole, 2×1 slot and 200 mesh high transmission grids, commercially available through SPI supplies. 75 mesh carbon composite grids are commercially available, manufactured by Agar Scientific, UK.

The technique of the invention can be carried out on nonplanar, for example, curved surfaces when a flexible or elastomeric applicator (20/40) is used. Where a nonplanar substrate 28 exists, a flexible or elastomeric applicator 20 or 40 can be bent to conform to the nonplanar substrate surface and the technique carried out as described. Where a precursor 36 of a high-carbon solid structure is viscous enough, a nonplanar substrate, such a cylindrical article (capillary or the like) can be rolled across surface 41 or 22 of applicator 40 or 20, respectively, the pattern transferred to the nonplanar article, and the high-carbon structure carbonized on the surface of the article.

The small, high-carbon solid structures of the invention find a variety of uses. For example, electrostatic lenses (for focusing electron beams; see FIG. 6), cantilevered structures, interdigitated comb structures for use as sensors, accelerometers, pressure sensors, and actuators, suspended micromirrors (light beam redirection uses), suspended vibrating structures (accelerometers, pressure sensors) and other types of motion sensors, suspended structures with diffraction gratings (beam splitting and redirection which are basic units for color displays), implantable devices such as physiological electrodes, microanalytical components (e.g., tips for scanning, tunneling microscopes; see FIGS. 11 and 12), flat panel displays, and micromachines and microelectronic circuitry such as microcarbon resistors and capacitors can be made. Binary diffraction gratings, holographic diffraction gratings, and features of Si-etched surfaces have been replicated by the technique of the invention.

One advantage of fabrication of the high-carbon structures of the invention is that high-carbon materials can be tailored in terms of electronic properties by subjecting the materials to a selected thermal treatment. For example, certain high-carbon precursor materials can be treated in one way to create a high-electrical resistance carbon structure, and in another way to create an electrically-conductive carbon structure. In this way, an electronic circuit can be fabricated by forming a structure in the shape of a circuit, and treating different portions of the circuit with different carbonization treatment temperatures (for example via laser heating) to create different areas of different electrical character. For example, resistors, capacitors, and the like can be formed in a single electrical circuit using the molding technique of the invention.

Additionally, various properties of various high-carbon structures can be tailored using fillers such as ceramics, silica, nanotubes, carbon black, and the like. These additives can be used to change mechanical properties.

According to another embodiment of the invention a high-carbon structure of desired shape is created by etching. In this embodiment, a high-carbon structure is provided, and a portion of the structure is etched by exposure to a chemical species with which the high-carbon structure is reactive. For example, a thin film of high-carbon structural material can be fabricated on a substrate and exposed, in a predetermined pattern, to reactive ion etching conditions (oxygen plasma, $CF_4$ plasma, or the like). The predetermined pattern can be defined by a mask of any type, including a mask applied via microcontact printing as described in U.S. Pat. No. 5,512, 131 and in International Patent Publication No. WO 96/29629, filed Mar. 1, 1996, both documents incorporated herein by reference. Reactive ion etching is beneficial since it is compatible with the silicon microfabrication industry. Etching can take place before or after carbonization of the high-carbon structure precursor, and after carbonization a high-carbon structure such as a glassy carbon structure can be created.

The function and advantage of these and other embodiments of the present invention will be more fully understood from the examples below. The following examples are intended to illustrate the benefits of the present invention, but do not exemplify the full scope of the invention.

EXAMPLE 1

Fabrication of High-Carbon Structure Molds

Fabrication of polydimethyl siloxane (PDMS) molds was performed according to a technique similar to that described in U.S. Pat. No. 5,512,131. The PDMS molds were prepared by casting PDMS (Sylgard 184, Dow Coming) on photolithographically generated masters consisting of patterned films of photoresist (Microposit STR 1075, Shipley, Mass.). The masks used in the photolithographic step were prepared by rapid prototyping. In this technique, a computer file of the design of interest was generated using Freehand 5.5. The file was printed on a transparent film with a high resolution printer (resolution>3300 dpi), and that transparent film was used as a mask to generate surface relief patterns in films of photoresists coated on Si wafers.

EXAMPLE 2

Fabrication of High-Carbon Structures

The substrates used for the preparation of the microstructures and subsequent carbonization were obtained by electron-beam evaporation of chromium thin films (400 Å) onto silicon wafers. Furfuryl alcohol modified phenolic resin was obtained from Q.O. Chemicals (Furcarb LP-520). Curing of the latter resin required the addition of a latent, heat-activated catalyst such as a 50% aqueous solution of $ZnCl_2$. The amount of catalyst never exceeded 10% (w/w) of the resin in order to prevent a too rapid cure and potential deformation of the microstructures. CAUTION: Mixing an acid catalyst with furfuryl alcohol-based resins induces an exothermic reaction. Alternatively, Bakelite (Georgia Pacific) was used, which does not require addition of a catalyst.

The precursor selected was a furfuryl alcohol-modified phenolic resin (alternatively, Bakelite (Georgia Pacific) can be used. This type of polymer is widely used as a precursor to carbon solids because of its low cost and relatively high carbon yield (~50%). Patterns of that polymer were generated, according to one set of embodiments, by allowing the fluid precursor to spontaneously fill the capillary channels defined by a surface relief of the PDMS mold in conformal contact with a substrate. This technique was used to prepare continuous structures such as wires and grids (e.g. structures shown in FIGS. 6 and 7). In another set of embodiments, the liquid polymer was applied to the recessed pattern of the PDMS mold. The excess polymer was removed by gently scraping with the edge of a second piece of PDMS. The PDMS mold was placed in contact with the substrate; this contact constrained the remaining polymer in the recessed channels of the mold. An excessive quantity of polymer prevented conformal contact of the PDMS mold with the substrate, so the quantity of polymer applied to the mold was minimized. The liquid polymer was cured within the mold by placing the substrate on a hot plate. The temperature was increased slowly from ~80 to 150° C. over ~45–60 min in order to induce polymerization of the liquid polymers. A fast cure distorted or destroyed the structure. Prolonged contact between the PDMS mold and the polymer was also detrimental, as the cured polymer tended to remain trapped in the mold rather than being transferred to the substrate. The best results were achieved when the procedure was performed in less than 1.5 h.

After completion of the curing step, the PDMS mold was removed, and the supported polymeric structures were converted into free-standing high-carbon structures by carbonization (400–1000° C.; in other processes, temperatures of 1800° C. were reached, and temperatures up to 3000 are expected to be potentially useful) under an inert atmosphere (argon). Carbonization was performed in a Blue M/Lindberg MiniMite tube furnace fitted with a quartz tube. The samples were placed in an alumina boat and introduced in the quartz tube. The chamber was deoxygenated by a rapid flow of argon for ~20 min prior to carbonization. Carbonization was performed under a positive pressure of argon. The temperature increased at a rate of 5° C./min up to the final temperature. The samples were kept at the final temperature for 10 min, and then allowed to cool down to room temperature.

EXAMPLE 3

Characterization of High-Carbon Structures

Resistance measurements were performed with a handheld voltmeter. The density of samples was estimated by floating solid samples in liquids of known densities. SEM was performed on a JEOL JSM-6400 scanning electron microscope operated at 15 keV. The samples were either glued to conductive carbon tape, or glued to a silicon substrate with silver paint. X-ray photoelectron spectra were obtained on a SSX-100 spectrometer (Surface Science Laboratories) using a monochromatic Al Ka X-ray source. The spot size was –1 mm$^2$ with an analyzer pass energy of 150 eV.

EXAMPLE 4

Microelectromechanical High-Carbon Display Element

Figure 15:
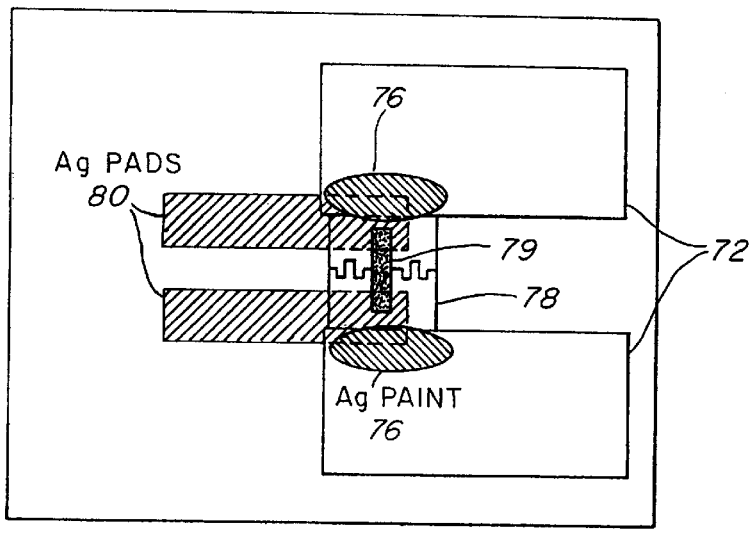
FIG. 15 is a schematic illustration of an electrically-induced high-carbon microstructure deflection device.

A Free-standing, high-carbon microstructure as shown in FIG. 3 was mounted on a substrate as illustrated in FIG. 15. The structure 78 was glued with conductive silver paint 76 over the edges of two cover slips 72 separated by ~1 mm. The resistivity of the carbon solid (prepared at 1000° C.) was ~0.03 Ω.cm. The central plate 79 of the device was electrostatically actuated simultaneously by attractive and repulsive forces: a voltage was applied between the carbon structure and one of two underlying silver electrodes 80 above which the plate 79 was suspended (attractive), while the second silver electrode was held at the same potential as the carbon structure (repulsive). The plate was deflected, and angle of deflection of a light beam directed toward the structure was thereby controlled electrostatically.

Figure 16:
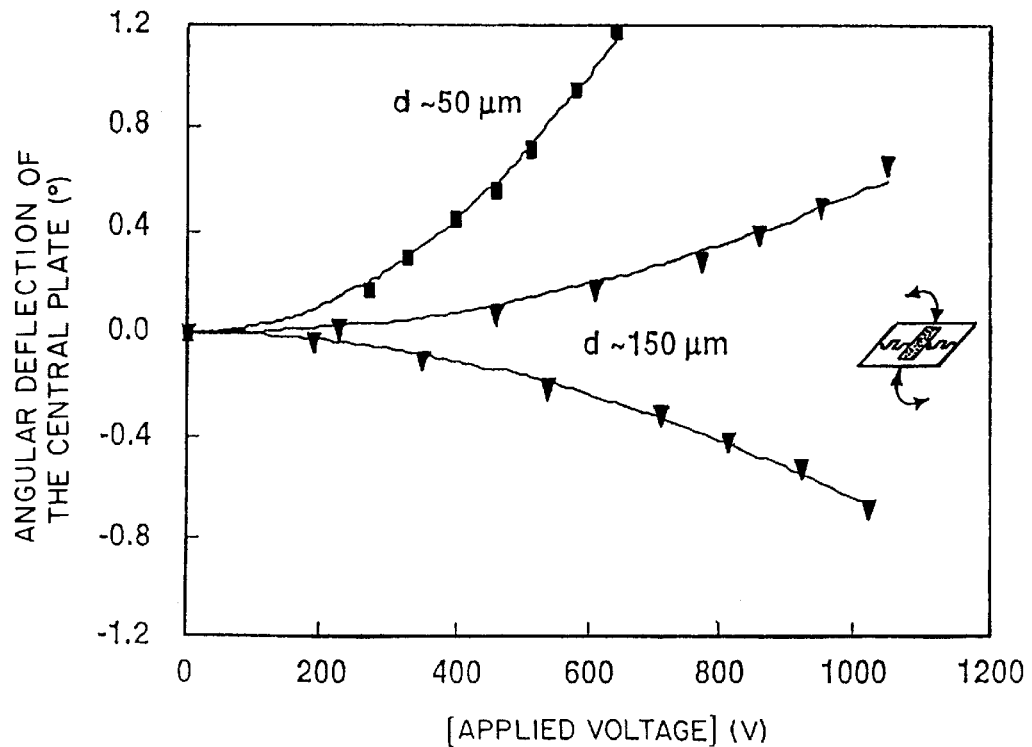
FIG. 16 is a plot of angular deflection of an electrostatically-actuated central plate of a high carbon structure of FIG. 3 as a function of voltage applied to nearby, spaced electrodes.

The angular deflection of the central plate as a function of applied voltage was plotted (FIG. 16), and showed smooth transition dependant on several factors including applied voltage, distance between the moving carbon element of the microstructure and the counter electrodes, and spring constant of the microstructure. The distance between the carbon microstructure and the counter electrodes was determined by the thickness of the insulating layer (glass cover slips or polyimide films) used in the procedure. As the thickness of that layer decreased, so did the voltage required to actuate the central plate. The structural dimensions and mechanical properties of the carbonaceous solid define the spring constant of the structure. The mechanical properties of the material were primarily defined by the temperature of pyrolysis. Design can enable deflection to be optimized by control of thickness, width, and dimensions of the supporting arms.

EXAMPLE 5

Tailoring of Electrical Properties of High-Carbon Microstructures

The mechanical, electrical, and chemical properties of high-carbon solids can be controlled over wide ranges by the temperature at which these solids are prepared. (see Jenkins, et al. *Polymeric Carbons—Carbon Fibre, Glass and Char*; Ed: Cambridge University Press, Cambridge 1976; Spain, *Chemistry and Physics of Carbon*; (Ed: Walker Jr., P. L.; Thrower, P. A.), Marcel Dekker. Inc., New York, vol. 16, 1981, pp. 119–304). The range of electrical properties that can be achieved is especially interesting: the conductivity of a phenol-formaldehyde resin can be controlled over a range of ~$10^{19}$ Ω$^{-1}$ cm$^{-1}$ by pyrolysis.

Supported structures of a phenol-formaldehyde resin and of a furfuryl alcohol modified phenolic resin were prepared by the technique illustrated in FIG. 1, using a PDMS mold. The PDMS mold was placed on a substrate, as described; the pattern in the PDMS formed a network of channels. A drop of fluid polymer precursor was placed at one end of the channels, and the fluid filled the channels by capillary action. Once the network of channels had filled with the fluid precursor, the substrate was placed on a hot plate and the polymer slowly cured (from 90 to 150° C.) for 1 hr. The PDMS stamp was then removed from the substrate. The structure defined by the surface relief in the PDMS remained on the substrate. After carbonization at 1000° C., the resulting structure was high-carbon wires ~7 mm long, 40 mm wide, 6 mm thick, and were separated by 60 mm. The wires underwent shrinkage of ~20% on carbonization.

The resistivity of wires prepared by carbonization between 600–1000° C. was determined by applying patches of silver paint to both ends of an array of 8–12 of the wires and multiplying the overall resistance by the number of wires electrically connected. The room temperature resistivity of the carbonaceous solid as a function of the maximum temperature reached during heat treatment was plotted. The resistivity dropped sharply at temperatures >600° C., from ~$10^3$ Ω.cm to reach a plateau of about ~$10^{-2}$ Ω.cm at ~1000° C.

The density of high-carbon solids was tailored. It was found that the density increased from 1.20 to 1.51 g/cm$^3$ in the range of temperature investigated (400–1000° C.). The density of a pyrolyzed phenol-formaldehyde resin reached a minimum (~1.1–1.2 g/cm$^3$) at –400–500° C., then increases to –1.5 g/cm$^3$ at 1200° C. For comparison, the density of graphite is 2.25 g/cm$^3$, and that of diamond is 3.51 g/cm$^3$.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. An article made by the process comprising:
   micromolding a precursor of a high-carbon solid; and
   removing the mold to produce a free standing high-carbon solid structure having a carbon content of at least 40% carbon atoms and having a dimension of less than 2 mm.

2. An article as in claim 1, wherein the structure has a dimension of less than 1 mm.

3. An article as in claim 1, wherein the structure has a dimension of less than 0.5 mm.

4. An article as in claim 1, wherein the structure has a dimension of less than 0.25 mm.

5. An article as in claim 1, wherein the structure has a dimension of less than 100 $\mu$m.

6. An article as in claim 1, wherein the structure has a dimension of less than 50 $\mu$m.

7. An article made by the process comprising:
micromolding a precursor of a high-carbon solid; and
removing the mold to provide a transmission electron micrograph grid of at least 100 mesh made of a high-carbon solid having a carbon content of at least 40% carbon atoms.

8. An article as in claim 7, comprising a transmission electron micrograph grid of at least 200 mesh.

9. An article as in claim 7, comprising a transmission electron micrograph grid of at least 300 mesh.

10. An article as in claim 7, comprising a transmission electron micrograph grid of at least 400 mesh.

11. An article as in claim 7, comprising a transmission electron micrograph grid of at least 500 mesh.

12. An article as in claim 7, comprising a transmission electron micrograph grid of at least 600 mesh.

13. A method for producing an article as in claim 1, wherein the method comprising:
forming a precursor of a high-carbon solid against a surface of a mold; and
removing the mold from the precursor to produce a free standing high-carbon solid structure having a carbon content of at least 40% carbon atoms and having a dimension of less than 2 mm.

14. A method as in claim 13, the forming step comprising forming the precursor between the surface of the mold and a substrate, the removing step comprising removing the mold from the precursor and allowing the precursor to remain on the substrate.

15. A method as in claim 14, further comprising removing the precursor from the substrate.

16. A method as in claim 13, comprising forming the precursor against a surface of a mold, heating the precursor, removing the mold, and carbonizing the precursor to form the high-carbon solid structure.

17. A method as in claim 13, further comprising carbonizing the precursor to form the high-carbon solid structure.

18. A method as in claim 13, wherein the high-carbon solid structure has a dimension of less than 5 $\mu$m.

19. A method as in claim 13, comprising:
applying a fluid precursor of a high-carbon solid structure to an indentation pattern in the surface of an elastomeric mold;
applying the elastomeric mold to a surface of a substrate to encapsulate the fluid precursor between the substrate surface and the indentation pattern;
heating the precursor;
removing the mold from the substrate;
carbonizing the precursor to form the high-carbon solid structure; and
removing the high-carbon solid structure from the mold to form the free-standing high-carbon solid structure.

* * * * *